United States Patent
Meyer et al.

(10) Patent No.: US 7,069,356 B2
(45) Date of Patent: Jun. 27, 2006

(54) METHOD OF CONTROLLING A QUEUE BUFFER BY PERFORMING CONGESTION NOTIFICATION AND AUTOMATICALLY ADAPTING A THRESHOLD VALUE

(75) Inventors: Michael Meyer, Aachen (DE); Reiner Ludwig, Hürtgenwald (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 237 days.

(21) Appl. No.: 10/474,382

(22) PCT Filed: Apr. 5, 2002

(86) PCT No.: PCT/EP02/03822

§ 371 (c)(1),
(2), (4) Date: Oct. 9, 2003

(87) PCT Pub. No.: WO02/082747

PCT Pub. Date: Oct. 17, 2002

(65) Prior Publication Data

US 2004/0111541 A1 Jun. 10, 2004

(30) Foreign Application Priority Data

Apr. 9, 2001 (EP) .................................. 01107850

(51) Int. Cl.
*G06F 3/00* (2006.01)
(52) U.S. Cl. .............................. 710/52; 710/54; 710/57; 710/60; 370/252; 370/235; 370/412; 370/468; 709/209; 709/223

(58) Field of Classification Search .................. 710/52, 710/54, 57, 60; 370/252, 235, 412, 468; 709/209, 223
See application file for complete search history.

(56) References Cited

U.S. PATENT DOCUMENTS

| 6,594,238 | B1 * | 7/2003 | Wallentin et al. ........... 370/252 |
| 6,747,990 | B1 * | 6/2004 | Umayabashi et al. ....... 370/468 |
| 2002/0059408 | A1 * | 5/2002 | Pattabhiraman et al. .... 709/223 |

FOREIGN PATENT DOCUMENTS

JP 2000261434 A * 9/2000

* cited by examiner

*Primary Examiner*—Tammara Peyton
(74) *Attorney, Agent, or Firm*—Roger Burleigh

(57) ABSTRACT

A method of controlling a queue buffer (2), said queue buffer (2) being connected to a link (1) and being arranged to queue data units (30) that are to be sent over said link (1) in a queue (20), comprising: determining (S1) a value (QL; QL?av#191) of a length parameter related to the length of said queue (20), comparing (S2) said value (QL; QL?av#191) with a length threshold value (L?th#191; min?th#191; max?th#191) and performing (S3) a congestion notification procedure if said value (QL; QL?av#191) is equal to or greater than said length threshold value (L?th#191; min?th#191; max?th#191), and an automatic threshold adaptation procedure (S4, S7), where said automatic threshold adaptation procedure (S4, S7) is arranged to automatically adapt said length threshold value (L?th#191; min?th#191; max?th#191) on the basis of one or more characteristics of said link (1).

32 Claims, 6 Drawing Sheets

METHOD OF CONTROLLING A QUEUE BUFFER BY PERFORMING CONGESTION NOTIFICATION AND AUTOMATICALLY ADAPTING A THRESHOLD VALUE

FIELD OF THE INVENTION

The present application relates to a method of controlling a queue buffer, said queue buffer being connected to a link and being arranged to queue data units that are to be sent over said link.

BACKGROUND OF THE INVENTION

In data unit based communication, i.e. in which an information to be transmitted is divided into a plurality of units, and the individual units are sent over a communication network, its is known to provide queue buffers at links along the network, such that units transported over such a link may be buffered. The buffer may be a sending or input buffer (i.e. a buffer for data units that are to be sent over the link) or a receiving or output buffer (i.e. a buffer for data units that have been sent over the link).

Such units for transporting data may carry a variety of names, such as protocol data units, frames, packets, segments, cells, etc., depending on the specific context, the specific protocol used and certain other conventions. In the context of the present document, all such units of data shall generically be referred to as data units.

The procedures for placing data units into a queue, advancing them in the queue, and removing data units from the queue are referred to as queue management.

A phenomenon that is known in data unit transmission networks is that of so-called congestion. Congestion implies a state in which it is not possible to readily handle the number of data units, that are to be transported over that connection or link. As a consequence of congestion at a given link, the number of data units in a queue buffer associated with said link will increase. In response to a congestion condition, it is known to implement a data unit dropping mechanism referred to as drop-on-full, according to which upon the receipt a new data unit for the queue buffer, a queue length related parameter, such as the actual queue length or the average queue length, is compared to a predetermined threshold, and if the predetermined threshold is exceeded, then a data unit is dropped. The threshold indicates the full state of the queue. "Dropping" means that it is not placed into the queue and consequently not transported further.

The data unit to be dropped can be the newly arrived one, in which case the mechanism is called tail-drop. Besides the technique of tail-drop, it is also known to perform a so-called random-drop, where a data unit already in the queue is selected according to a random function, or a so-called front-drop, where the first data unit in the queue is dropped. Such drop-on-full mechanisms not only serve to reduce the load on the congested link, but also serve as an implicit congestion notification to the source and/or destination of the data unit. Namely, as e.g. known from TCP (Transmission Control Protocol), congestion control mechanisms are typically implemented with respect to the receiver and sender of data units, such that when detecting that a data unit has been lost, the rate and/or amount of data units being sent is reduced.

Besides such queue managements systems that start dropping data units once a predetermined threshold is exceeded, i.e. when the queue is determined to be "full", a more sophisticated management scheme has also been proposed, which is known as active queue management and is described in Request for Comments (RfC) 2309. More specifically RfC 2309 proposes an active queue management mechanism referred to as Random Early Detection (RED). The concept of RED according to RfC 2309 consists in the recognition that it is useful to not wait until a queue is full, but to much rather implement a mechanism that leads to a dropping of some packets prior to reaching the full state.

According to RfC2309, the RED algorithm consists of two main parts, namely first estimation of the average queue size and then a decision of whether or not to drop an incoming data unit. More specifically, when a new data unit arrives, the algorithm estimates the average queue size, and if the average queue size lies between a minimum threshold $min_{th}$ and a maximum threshold $max_{th}$, then a probability value is calculated as a function of the average queue size, and the decision regarding the dropping of the incoming data unit is performed in dependence of the resulting probability. If the average queue size exceeds the maximum threshold maxth, then the incoming data unit is necessarily dropped. The probability funtion is a linear function that has a value $p(min_{th})=0$, and where $p(max_{th})$ is a predetermined maximum probability $max_p$, where $max_p$ is smaller than 1.

Regarding the choice of the minimum threshold $min_{th}$ or the maximum threshold $max_{th}$, RfC2309 does not give any information.

In the paper "Random Early Detection Gateways for Congestion Avoidance" by Sally Floyd and Van Jacobson, IEEE/ACM Transactions on networking, August 1993, an extensive discussion of the RED algorithm is given, where the minimum threshold $min_{th}$, maximum threshold $max_{th}$ and the maximum probability $max_p$ are all set as fixed parameters. Regarding the choice of $min_{th}$ and $max_{th}$, it is mentioned that the optimum values for these thresholds depend on the desired average queue size, and the optimal value for $max_{th}$ depends in part on the maximum average delay that can be allowed by the link. Furthermore, it is stated that $max_{th}$ should at least be twice as large as $min_{th}$.

In an internet document discussing the setting of RED parameters, published by Sally Floyd at http://www.acir.org/floyd/REDparameter.txt, it is mentioned that the optimum value for fixing $min_{th}$ will depend partly on the link speed, the propagation delay and the maximum buffer size.

In the article "Techniques for eliminating packet loss in congested TCP-IP networks" by Wu-chang Feng et al., November 1997, a so-called adaptive RED is proposed, in which the probability parameter $max_p$ is adapted to the traffic load. Although the detailed algorithm described in this document uses fixed thresholds, it is indicated at the end that the threshold values could also be made dependent on the input traffic. A similar proposal is made in the article "A self configuring RED gateway" by Wu-chang Feng et al., Infocom '99, March 1999.

Another proposal for improving RED is made in WO 00/60817, in which a differentiation is introduced between traffic originating from rate adaptive applications that respond to packet loss. This document suggests introducing at least two drop precedent levels, referred to as "in profile" and "out profile". Each drop precedent level has its own minimum threshold $min_{th}$ and/or maximum threshold $max_{th}$.

From WO 00/57599 a queue management mechanism is known, in which drop functions are selected according to ingress flow rate measurements and flow profiles.

From U.S. Pat. No. 6,134,239 a method of rejecting ATM cells at an overloaded load buffer is known. The concept of RED is mentioned. According to this document, a first threshold related to the overloaded buffer queue, and a second threshold associated with a specific connection are monitored, and incoming packets are dropped for the specific connection if both thresholds are exceeded.

U.S. Pat. No. 5,546,389 describes a method for controlling the access to a buffer and is specifically concerned with ATM buffers. The use of one or more thresholds and the dynamic control of such thresholds is mentioned, where the dynamics are determined on the basis of incoming and outgoing traffic.

EP-1 028 600 described a buffer management scheme with dynamic queue length thresholds for ATM switches. A common threshold is dynamically updated every time that a new cell arrives, where the new value is determined based on traffic condition.

Another improvement proposal for RED is described in EP-0 872 988, which has the object of providing isolation when connections using different TCP versions share a bottleneck link. The solution proposed in this document is the use of bandwidth reservation guarantees for each connection. If one connection is being under-utilized, then another connection may use a part of the under-utilized connection's bandwidth. When the connection needs to reclaim its buffer space a predetermined package dropping mechanism is operated, such as a longest queue first (LQF) mechanism.

OBJECT OF THE INVENTION

The object of the present invention is to provide an improved method of controlling a queue buffer, where said method compares a queue length related parameter with a length threshold value and employs an automatic threshold adaptation procedure.

SUMMARY OF THE INVENTION

The above object is solved by a method having the features of claim 1. Advantageous embodiments are described in the dependent claims.

According to the present invention, the automatic threshold adaptation procedure is arranged to automatically and dynamically adapt a length threshold value, such as e.g. the minimum threshold $min_{th}$ known from RED or the single threshold known from drop-on-full queue management schemes, on the basis of one or more characteristics of the link over which the data units in the queue buffer are to be sent.

Therefore, in contrast to the above discussed prior art, in which the length threshold value was either a fixed value or adapted to the traffic load condition, the present invention proposes automatically and dynamically adapting the length threshold on the basis of link characteristics. This leads to a highly flexible form of active queue management that provides improved throughput and reduced delay, especially over links that have time varying characteristics, such as wireless links.

The method of the present invention may be applied to any of the known queue management schemes in which a queue length related parameter is compared to at least one length threshold value, and where a congestion notification procedure is conducted, if the threshold is exceeded. Namely, the present method is e.g. applicable to any of the above mentioned RED schemes, to the schemes that drop data units when a queue is full, be it tail-drop, random-drop or front-drop, and to any known schemes that perform explicit congestion notification instead of dropping.

Furthermore, although a preferred embodiment of the present invention applies the method to the queuing of IP (internet protocol) packets, the method of the present invention is not restricted to data units of any specific protocol, and can e.g. also be applied to queue management methods for ATM cells.

According to a preferred example of the present invention the one or more link characteristics are the round trip time (RTT) of the link and the data rate (DR) or bit rate of the link, and the threshold adaptation procedure comprises an updating of the length threshold value as a function of the round trip time and data rate of the link. This updating may be performed at regular intervals, or in response to a specific triggering-event, such as a change in the above mentioned link characteristics. In other words, in the latter alternative the threshold value is updated as a function of the round trip time and the data rate every time that the round trip time or data rate change. It may be noted that an updating of the threshold value will not be initiated upon infinitesimally small changes of the link characteristics under consideration, as there will be a certain granularity. In other words, changes of the link characteristics under consideration will be monitored, and if one of the characteristics changes by more than a predetermined step or grain size, then the threshold will be updated.

More preferably, the function for updating the threshold value consists in calculating a link capacity value (LC) on the basis of the round trip time and the data rate, and then setting the threshold value equal to the calculated link capacity value or at least determining the threshold value as a function of said link capacity value, e.g. as the sum of said link capacity value and a predetermined constant.

The automatic threshold adaptation procedure may also comprise the automatic changing of the value of the length threshold depending on the connectivity state of the link. In other words, in this case the connectivity sate of the link is the link characteristic on which the adaptation is based. Especially, in the event that the link loses connectivity, i.e. can not transport data units, the length threshold value is preferably automatically increased, e.g. multiplied by a predetermined factor, such as 2. The changing of the length threshold value depending on the connectivity can be implemented by itself, or can be combined with the abovementioned updating procedure of the length threshold depending on such link characteristics as the round trip time and the data rate.

Preferably, the procedure of changing the length threshold value in response to the connectivity of the link also comprises a feature of resetting the length threshold value after the connectivity state again allows the transmission of data units. This resetting can be done back to the previous value of the length threshold value, or a new length threshold value may be calculated on the basis of one or more characteristics, such as the above mentioned round trip time and data rate. The resetting operation preferably also takes into account the number of data units in the queue (the actual queue length) at the time of resetting in order to gradually reset the length threshold value to the new value.

The congestion notification procedure employed in association with the present invention can be chosen as is desirable or suitable, and any known implicit or explicit congestion notification procedure can be used. For example, as an implicit congestion notification procedure, a data unit dropping decision can be made, where said decision can either depend on a given probability (as in the case of RED techniques) or can be conducted unconditionally (as in the case of drop-on-full techniques). An example of an explicit congestion notification procedure consists in setting an appropriate congestion flag in a data unit. For example, the so-called ECN (explicit congestion notification) flag in the IP header of an IP packet can be set. Again, the decision of setting or not setting the flag can be made conditional on a predetermined probability function, or can be unconditional. It is also noted, that the congestion notification procedure employed in association with the present invention can be a combination of an implicit congestion notification procedure and an explicit congestion notification procedure, i.e. can consist in performing decisions regarding data unit dropping and in decisions regarding the setting of explicit congestion notification flags in data units.

As already mentioned previously, the present invention can be applied to queue management methods that use at least one length threshold value. In other words, it can be applied to queue management methods using drop-on-full techniques, where the single threshold indicating a full queue is automatically adapted, or can be applied to queue management methods using a plurality of thresholds, such as RED that uses two thresholds $min_{th}$ and $max_{th}$. In accordance with the present invention, if a plurality of thresholds are employed, then it is possible that only one of these is automatically adapted on the basis of one or more link characteristics, while the others remain fixed, or the others may also be adapted automatically, be it on the basis of the same characteristics, or be it that each threshold is adapted on the basis of respective individual link characteristics associated with that specific threshold. As an example, it is possible that the minimum threshold $min_{th}$ of RED is adapted on the basis of a first set of link characteristics and the maximum threshold $max_{th}$ is adapted on the basis of a second set of link characteristics, different from said first set.

According to a preferred embodiment, in which the method of the present invention is applied to RED, the minimum threshold $min_{th}$ is updated on the basis of the round trip time and the link data rate, and the maximum threshold $max_{th}$ is updated on the basis of the same link characteristics, namely in that the maximum threshold $max_{th}$ is simply calculated as the sum of $min_{th}$ and a predetermined constant.

BRIEF DESCRIPTION OF FIGURES

The present invention shall now be described by referring to detailed embodiments thereof, which are not to be understood as restricting the invention, which embodiments will be described by referring to the appended figures in which.

DETAILED DESCRIPTION

Figure 1:
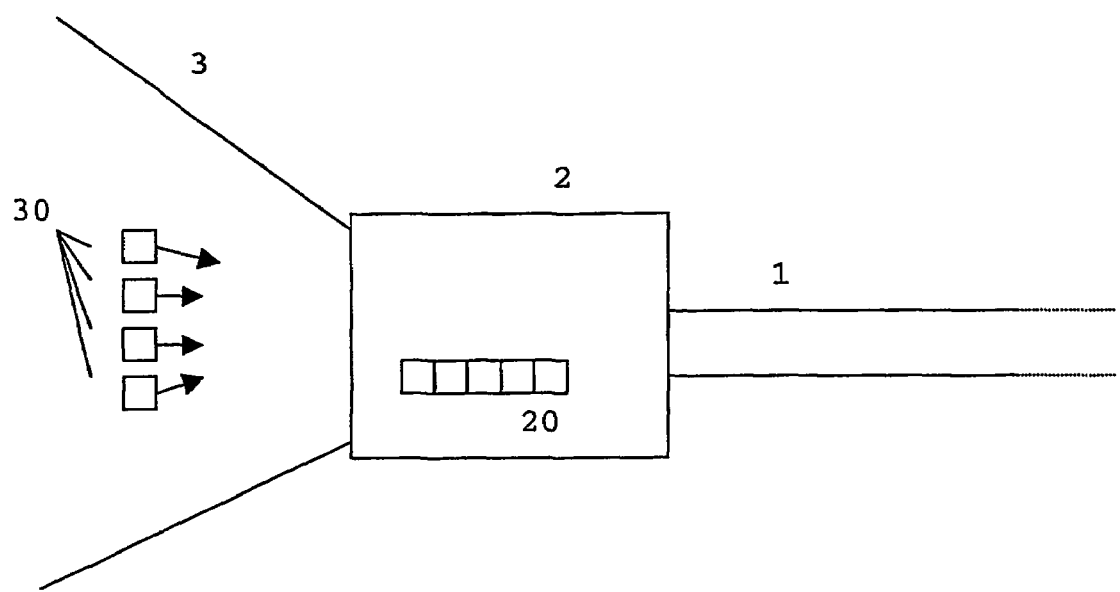
FIG. 1 shows a schematic block diagram of a queue buffer.

FIG. 1 shows a schematic block diagram of a queue buffer 2, which is connected to a link 1 and is arranged to queue incoming data units 30 in a queue 20, in order to transmit said data units 30 over said link 1. The queue buffer is included in an element (not shown) belonging to a network 3 that transports said data units 30. For example, the element can be a router in the network 3.

The queue buffer 2 can equally well be arranged to act as a receiving buffer for receiving data units from the link 1, and outputting the queued data units to the network 3

As already mentioned previously, in accordance with the present invention, the link 1, queue buffer 2, and data units 30 can be of any desired type. For example, the data units 30 can be IP packets and the queue buffer 2 can be a part of an IP router for forwarding said IP packets. However, the queue buffer 2 can also be an ATM buffer, in which case the data units 30 are ATM cells.

Although the link can be of any suitable or desired type, the method of the present invention is preferably applied to a queue buffer connected to a wireless link, such as a radio telephone link. For example, the link 1 could be provided by a mobile cellular telephone network arranged according to GSM (Global System for Mobile communication), UMTS (Universal Mobile Telephone System) or any other mobile communication standard. Namely, due to the fact that wireless links generally have time varying characteristics, the automatic threshold adaptation procedure on the basis of one or more link characteristics is especially effective and useful.

Namely, the queue management method of the present invention can effectively adapt to the time varying characteristics of the wireless link by adapting the one or more length threshold values with which a queue length related parameter is compared in order to start a congestion notification procedure.

Figure 2:
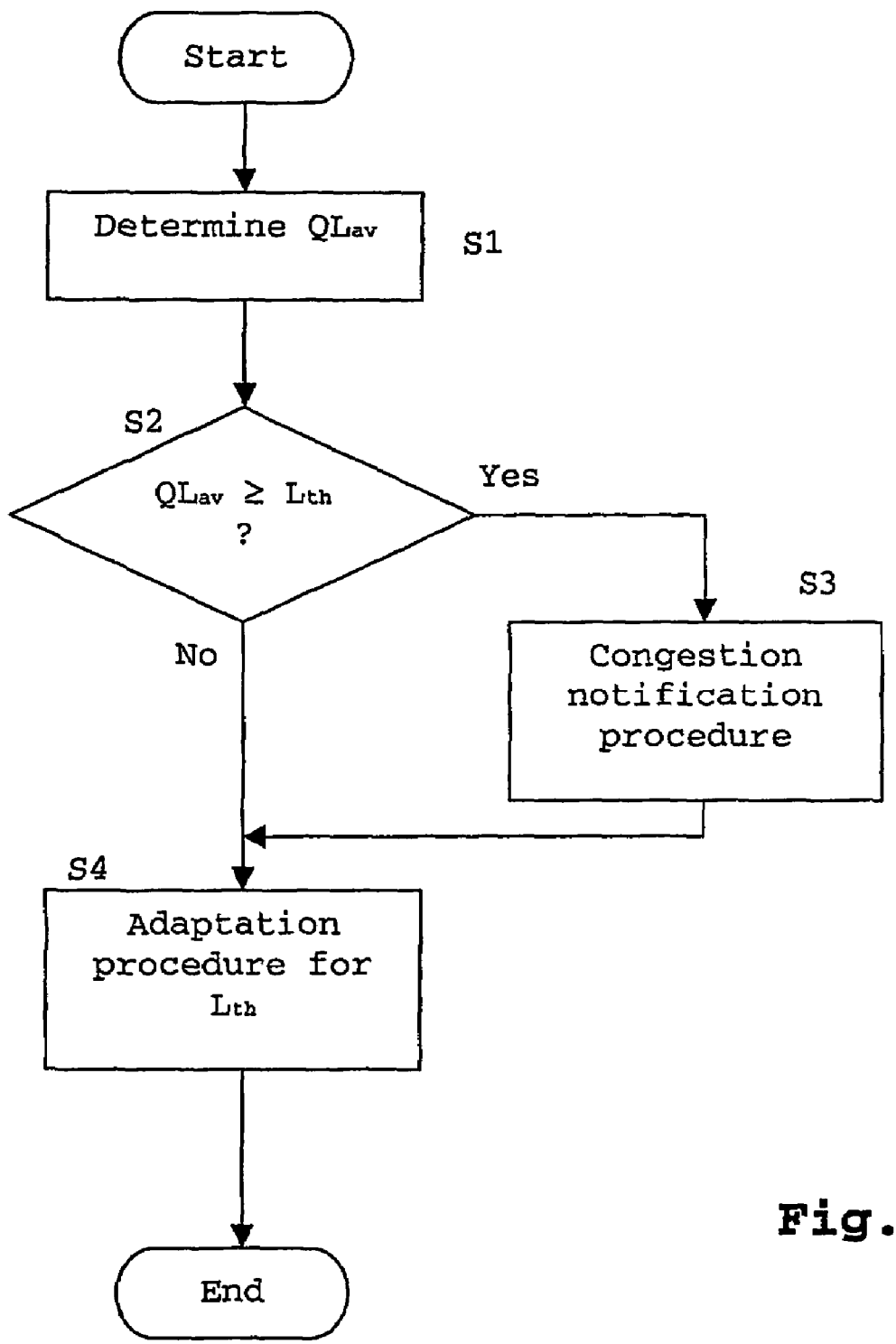
FIG. 2 shows a flow chart for explaining a basic embodiment of the present invention.

FIG. 2 shows a flowchart of a basic embodiment of the method of the present invention. In a step S1, a value of a length parameter related to the length of the queue 20 is determined. This queue length related parameter can be related to the queue length in any desirable suitable way, e.g., can be the actual or momentary queue length QL, or a parameter derived from the actual or momentary queue length, such as an average value $QL_{av}$.

In the example of FIG. 2, the queue length related parameter is an average queue length $QL_{av}$. This average queue length $QL_{av}$ can be determined in accordance with any known or suitable averaging algorithm, and such an algorithm may typically consist in updating an old average value by calculating the sum of the old average multiplied by a first weight factor and the momentary queue length multiplied by a second weight factor. For example, $QL_{av}$ can be calculated as $$QL_{av}(\text{new}) = QL_{av}(\text{old}) \times (1 - \tfrac{1}{2}^n) + (QL \times \tfrac{1}{2}^n) \quad (1)$$

where QL represents a momentary queue length value and n is an exponential weight factor adjustable between 0 and 1.

Then, in step S2, $QL_{av}$ is compared with a length threshold value $L_{th}$. If the length threshold value $L_{th}$ is exceeded, then a congestion notification procedure S3 is performed, otherwise the congestion notification procedure S3 is skipped.

In the example of FIG. 2, the flow then proceeds to an automatic threshold adaptation procedure for $L_{th}$, namely in step S4. In accordance with the present invention, this automatic threshold adaptation procedure S4 is arranged to automatically adapt the length threshold value $L_{th}$ on the basis of one or more characteristics of the length 1.

It may be noted that the specific arrangement of the steps shown in FIG. 2 is only an example. Especially, steps S1, S2, and S3, which form a procedure for deciding on the performing of a congestion notification procedure, are independent of the adaptation procedure before $L_{th}$ of step S4. Consequently, steps S1, S2, and S3 may be arranged independently of S4, namely S4 can also be performed prior to S1–S3, or in parallel thereto. Especially, it may be noted that steps S1 to S3 on the one hand, and step S4 on the other hand, will generally be contained in a larger method of controlling a queue buffer having more steps, but such additional steps are not shown, as they do not pertain to the present invention. The method of FIG. 2 may be implemented as software, and the steps S1–S3 can e.g. be implemented in one thread, while S4 may be implemented in another, independent thread. However, the method can also directly be implemented in the form of hardware.

Figure 3:
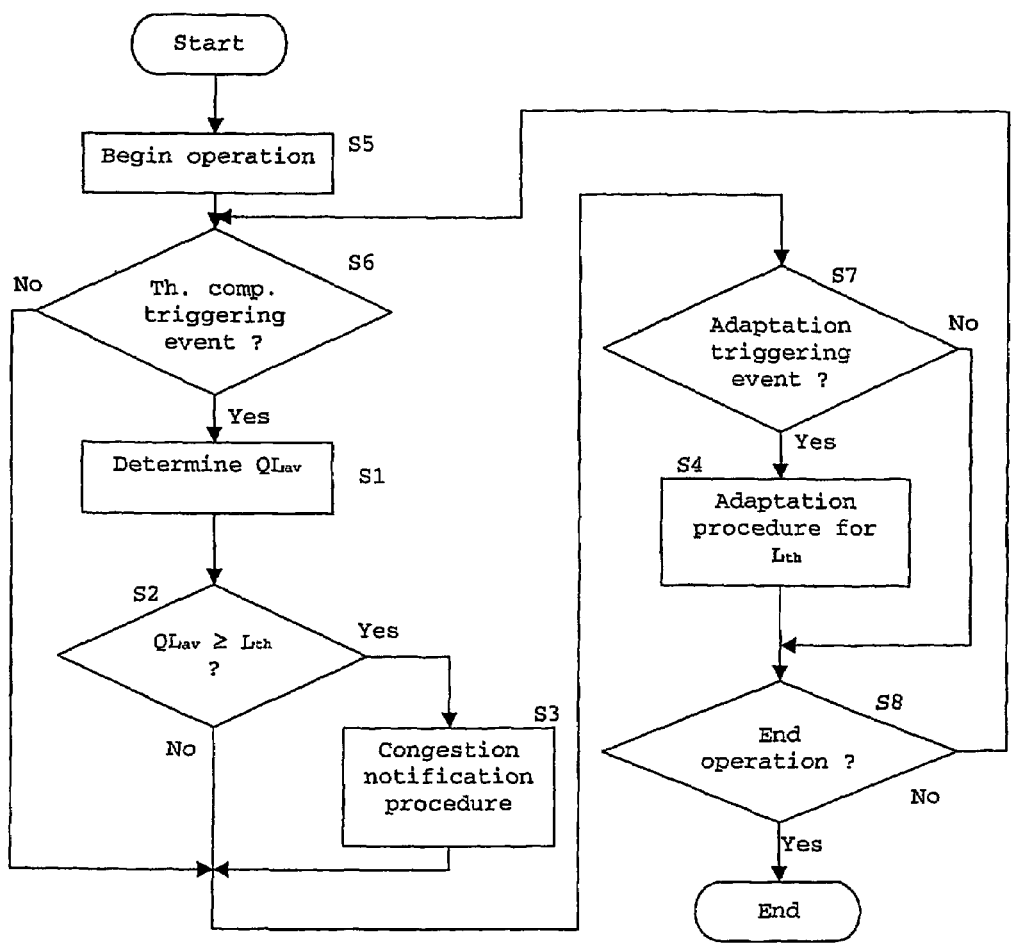
FIG. 3 shows a flow chart for explaining a more detailed embodiment of the present invention.

A flowchart showing a more detailed embodiment of the present invention is shown in FIG. 3. The steps that are identical or equivalent to those shown in FIG. 2 are referred to by the same reference signs, and the description thereof is not repeated.

It may be noted that the queue length related parameter, such as $QL_{av}$, and the length threshold $L_{th}$ can be expressed and measured in any desirable or suitable way. For example, it is possible to express these parameters as data quantities, i.e., in bits or bytes, or these parameters can also be expressed as numbers of data units, i.e., an actual queue length QL is expressed as an integer number of data units (due to averaging, the average queue length $Ql_{av}$ will nonetheless generally not be an integer).

According to the example in FIG. 3, a session begins at a step S5. Thereafter, step S6 determines if a threshold comparison triggering event has occurred. If such an event has occurred, then steps S1, S2, and S3 are performed, as already explained in connection with FIG. 2. If not, or after having gone through steps S1 to S3, the flow proceeds to step S7. In step S7, it is determined if an adaptation triggering event has occurred, and if this is the case, then the automatic adaptation procedure for $L_{th}$ of step S4 is performed. If the outcome of step S7 is negative, and after the completion of step S4, the flow of FIG. 3 proceeds to step S8, in which it is determined if the session is to end. If the session is not to end, then the flow loops back to step S6, and otherwise the flow comes to an end.

The threshold comparison triggering event of step S6 can be chosen in any desirable or suitable way. For example, the threshold comparison of steps S1 to S3 can be initiated regularly, i.e., at regular intervals. In this case, the threshold comparison triggering event will, e.g., be the occurrence of a specific timing condition, or the event that a counter reaches a specified value. As an example, a threshold comparison counter can be implemented, which counts down from a predetermined value to zero, and the threshold comparison triggering event of step S6 is given when this counter reaches zero. If it is determined that the value is zero, then the procedure of steps S1 to S3 is initiated, and the counter is reset to the predetermined value, such that a new countdown will commence.

The threshold comparison can also be triggered by events related to the receipt or transmission of data units to the queue, or specific actions taken with respect to individual data units in the queue. For example, the threshold comparison triggering event can consist in the release of a data unit to the link. Preferably, the threshold comparison triggering event of step S6 consists in the arrival of a new data unit that is to be buffered.

The adaptation triggering event in step S7, which leads to initiation of the automatic threshold adaptation procedure S4, may also be chosen as is suitable or desirable. For example, it is possible to initiate the automatic threshold adaptation procedure at regular intervals, such that the adaptation triggering event in step S7 can be a certain time condition becoming true, or the event that a counter reaches a predetermined value, as already described above in connection with the triggering event of step S6. The two triggering events in step S6 and step S7 can have the same regular period, or can be chosen to occur at different regular intervals. In other words, the same counter can be used to determine the triggering events of steps S6 and step S7, in which case the two steps S6 and S7 effectively merge into a single step, or two different counters or counter values can be used that respectively count down different initial values.

Preferably, the adaptation triggering event of step S7 consists in a change in one or more of the link characteristics that serve as a basis for adapting the length threshold value $L_{th}$. It may be noted that in practice a change will only be determined with a certain granularity. In other words, not any ever so small change in a characteristic will be considered a triggering event, but much rather only when a change of a predetermined magnitude occurs.

Figure 4A:
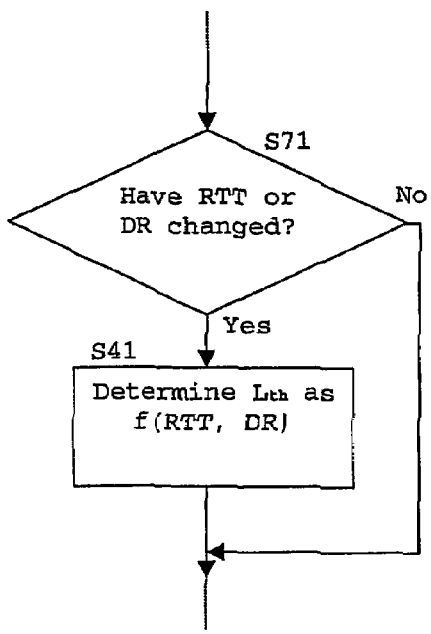
FIG. 4 shows flow chart sections for explaining different threshold adaptation procedures.

An example of using a change in a characteristic as a triggering event is shown in FIG. 4a, where the illustrated steps S71 and S41 replace steps S7 and S4 of FIG. 3. Namely, FIG. 4a shows an example, where the automatic threshold adaptation procedure is based upon the round trip time RTT and the data rate DR of link 1. Consequently, step S71 checks if one or both of the round trip time RTT and the data rate DR have changed, and if this is the case, then a new value of the length threshold $L_{th}$ is determined as a function of RTT and DR. It may be noted that the above mentioned round trip time RTT only relates to the link 1, and is not an end-to-end round trip time.

As is known in the art, the round trip time RTT is a parameter that is indicative of the time period that passes between the sending of a data unit and a receipt of an associated acknowledgement message. The RTT can be determined in any suitable or desirable way, and especially in any known way. For example, the RTT is automatically measured in such systems that employ ARQ (Automatic Retransmission reQuest), but even in systems that do not employ ARQ, the RTT can be measured by means of an appropriate dedicated scheme, such as the sending of a dedicated RTT measuring signal from the sending side of link 1 to the receiving side of link 1, where the receiving side is arranged to send back an appropriate acknowledgement message. An example of this is also known as "ping".

Like the link's RTT, the data rate DR can also be determined in any suitable or desired way, and especially in any known way. For example, DR can be measured by dedicated measurements, or it can also be a parameter already available from another control procedure that requires the DR as an input.

Preferably, the procedure for updating $L_{th}$ in step S41 comprises appropriately estimating a link capacity value LC on the basis of the round trip time RTT and the data rate DR. The link threshold value $L_{th}$ is then determined on the basis of the estimated link capacity value LC.

Now another embodiment of the present invention shall be described with reference to FIG. 6. In this embodiment the method of controlling a queue buffer employs two length threshold values, a minimum threshold $min_{th}$ and a maximum threshold $max_{th}$. In this example, the threshold $L_{th}$ mentioned in connection with the embodiments of FIGS. 2, 3 and 4a corresponds to $min_{th}$. The congestion notification procedure of step S3 then consists in determining if the value of $QL_{av}$, which was found to exceed $min_{th}$ in step S2, exceeds $\max_{th}$, or if it lies between $\min_{th}$ and $\max_{th}$. This is shown as step S31 in FIG. 6. It may be noted that these steps S31–S34 of FIG. 6 can be used in the place of step S3 shown in FIGS. 2 and 3, i.e. the steps S31 to S34 of FIG. 6 constitute a specific example of the congestion notification procedure of step S3.

Figure 6:
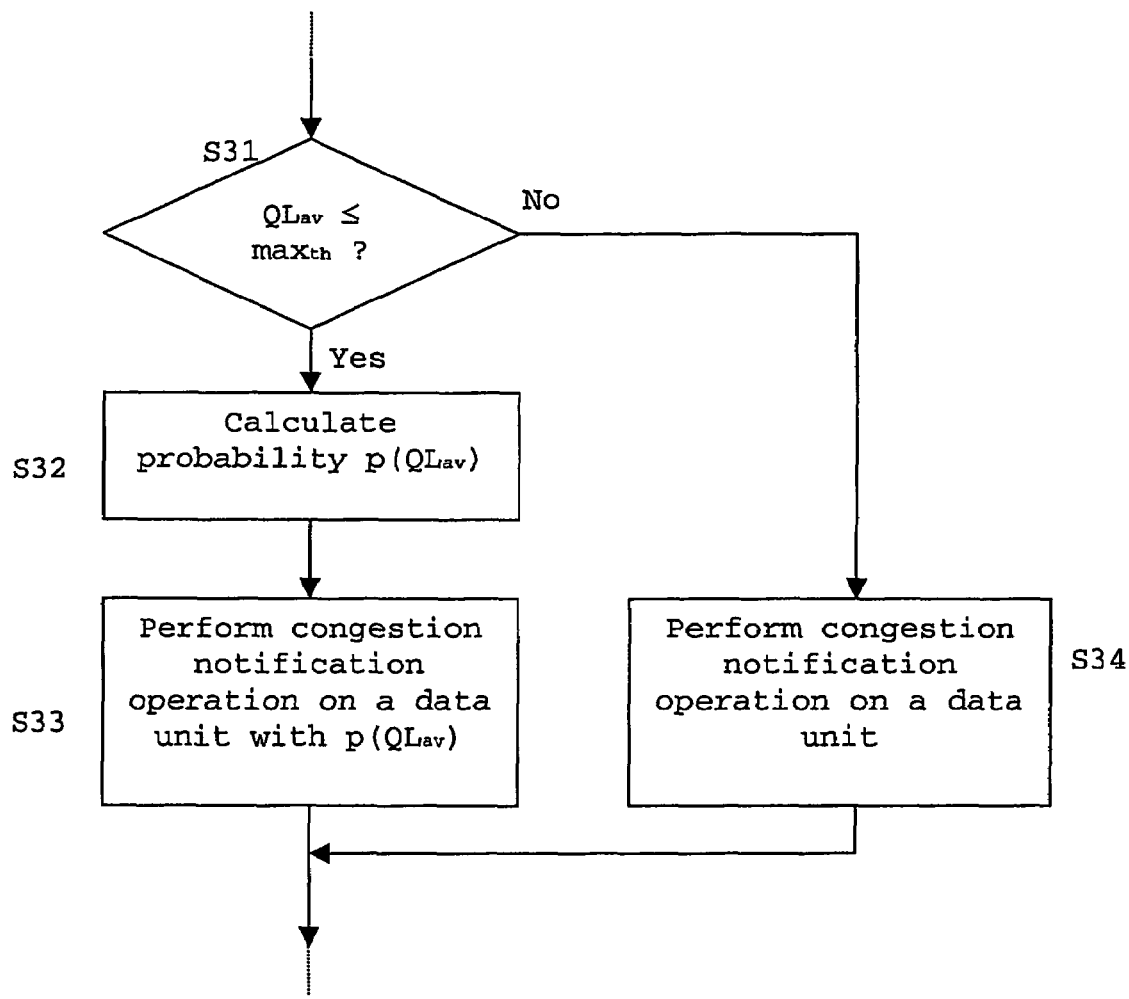
FIG. 6 shows a flow chart of an embodiment of a congestion notification procedure.

As shown in FIG. 6, if $QL_{av}$ lies between $\min_{th}$ and $\max_{th}$, then the procedure goes to step S32, in which a probability p is calculated in dependence on $QL_{av}$. For example, a function $p(QL_{av})$ can be defined that is linear and has a value $p(\min_{th})=0$ and $p (\max_{th})=\max_p$, where $\max_p$ is a maximum probability value that can be fixed, or can itself be an adaptive parameter. Naturally, other types of functions for $p(QL_{av})$ can be chosen as is suitable or desirable.

Then, after step S32, a congestion notification is performed on a data unit with the probability value $P(QL_{av})$ calculated in step S32, see step S33. On the other hand, if the outcome of step S31 is negative, i.e. $QL_{av}$ exceeds $\max_{th}$, then an unconditional congestion notification operation is performed on a data unit in step S34.

The performance of the congestion notification operation in dependence on the probability value $p(QL_{av})$ in step S33 can e.g. be conducted in such a way that a random process is conducted using the probability as a weight, where the random process generates a "yes" or "no", and the "yes" is generated with the probability $p (QL_{av})$. Such procedures are well known in the art and need not be further described here. If the outcome of the process is "yes", then a congestion notification is performed and if the outcome is "no", then no congestion notification operation is performed.

The congestion notification operation conducted in step S33 or step S34 can be selected in any suitable or desirable way, and can for example consist in an implicit congestion notification operation, such as the dropping of a data unit, or can consist in an explicit congestion notification operation, such as the setting of an appropriate notification flag in a data unit or the sending of an explicit notification message (source quench). This has already been described earlier, such that a repeated description is not necessary. It may be noted that the same type of congestion notification operation can be performed in steps S33, S34, e.g. a dropping operation in both cases or a flagging operation in both cases, but it is equally well possible to perform one type of congestion notification operation in step S33 and another in step S34, e.g. the congestion notification operation in step S33 can be a data unit dropping action, whereas the congestion notification operation of step S34 can be a flagging operation.

Furthermore, the procedure for determining a data unit on which the congestion notification operation in step S33 or S34 is to be performed, can be selected in any suitable or desirable way. For example, the congestion notification operation can always be performed on the last arrived data unit, or a data unit from among the queue data units can be selected by a random process, or the first data unit in the queue can be selected. Such techniques for selecting a data unit for performing a congestion notification operation are known in the prior art, and any such known technique is applicable, such that a further description is not necessary here.

In accordance with the present embodiment, which uses two thresholds $\min_{th}$ and $\max_{th}$, the adaptation procedure of step S4 (FIG. 2, 3) or S41 (FIG. 4a) consists in first estimating the link capacity LC according to the equation $$LC=(RTT_{WC}+RTT) \cdot DR \qquad (2)$$

where DR is the data rate of the link, RTT is the round trip time of the link, and $RTT_{WC}$ is a predetermined constant. Then the lower threshold $\min_{th}$ is determined as a function of the estimated link capacity LC, for example is set equal to said estimated link capacity LC, or set equal to said sum of LC and another predetermined constant $\epsilon$. Finally, the upper threshold $\max_{th}$ is set equal to the sum of $\min_{th}$ and a further predetermined constant.

Regarding the choice of the first predetermined constant $RTT_{WC}$, this constant is preferably chosen to be an estimate of the overall worst-case end-to-end round trip time for data units being transported over said link, where end-to-end implies from the data unit source to the data unit destination, and where furthermore $RTT_{WC}$ does not include the RTT contribution of the link itself. However, $RTT_{WC}$ should not be set to infinitely high values, such that when using the Internet of the year 2001 as a basis, a value of 300 ms should preferably not be exceeded. Due to the fact that on the other hand the value of $RTT_{WC}$ should reflect a maximum RTT, namely a worst-case RTT, it is preferred that $RTT_{WC}$ is set in the range of 200 ms to 300 ms, and more preferably in the range of 200 ms to 250 ms, using the Internet of the year 2001 as a basis.

Naturally, in other types of networks than the Internet, smaller ranges are possible, and also in the future Internet, depending on the increase in speed with respect to the present Internet of the year 2001.

The second predetermined constant $\epsilon$ may be zero, or a small value with respect to typical link capacity values. For example, if the link has a rated or maximum link capacity of $LC_{max}$ then $\epsilon$ may be chosen in the range of 0 to $0.01 \cdot LC_{max}$. Equally, $\epsilon$ can be set to be the equivalent of a small number of data units, such as two or three.

Finally, regarding the third constant for calculating $\max_{th}$, this third constant is preferably a small number of data units, e.g. 3 to 6 data units. If $\min_{th}$ and $\max_{th}$ are expressed in numbers of data units, then it is sufficient to add an integer in the range of 3–6 to $\min_{th}$ in order to determine $\max_{th}$, and in the case that $\min_{th}$ and $\max_{th}$ are represented as data amounts (in bytes or bits), then the third constant will be determined as a predetermined data unit size (such as the maximum segment size) measured in an amount of data, multiplied by an integer in the range of 3–6.

The present embodiment of the invention using the adaptation of $\min_{th}$ ($L_{th}$) on the basis of above described equation (2) is preferably applied to a buffer for buffering IP packets in a network where the flow control for sending out such IP packets operates according to the Transmission Control Protocol (TCP) or a protocol using a comparable congestion control scheme, such as TCP-friendly rate control for rate based protocols. Namely, the above described settings for the threshold ensure that a network-limited TCP sender (network-limited means that the number of packets that are in flight is limited by congestion control) will fully utilize its available bandwidth. It has been recognized by the inventors of the present invention that a network-limited TCP sender should be allowed to grow its send window to at least two times the capacity of the pipe into which the packets are being fed, in order to fully utilize the available bandwidth across multiple load decrease events.

As already mentioned above, the first constant $RTT_{WC}$ is preferably set to a value that estimates a worst-case end-to-end round trip time for data units that are buffered in the queue buffer 2 and pass over the link 1. A more precise selection of this constant than simply setting it in the above mentioned range of 200 to 300 ms, can especially be achieved if the end-to-end round trip time can be estimated sufficiently well. This will especially be the case if the queue being managed contains data units belonging to one flow. A flow is identified by a source and destination address, the source and destination port number and a protocol identifier. The definition and concept of a flow is well known in the art, e.g. in the context of TCP (transmission control protocol), such that a further explanation is not necessary here. In this case, a more precise estimation of the worst-case round trip time from end to end minus the link's round trip time is possible. It may be noted that typically a queue buffer will buffer data units belonging to a plurality of different flows. However, it is envisionable that the queue buffer 2 provides a plurality of queues 20, where each queue is associated with a given flow, and each queue is managed in accordance with its own individual control parameters.

Figure 4B:
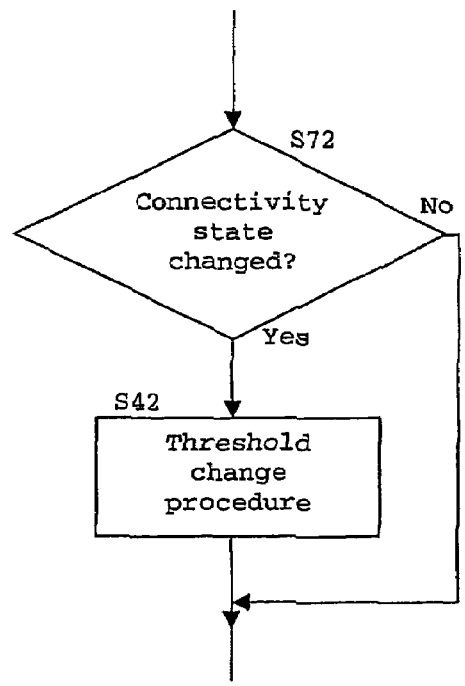

In the above described embodiment and the embodiment of FIG. 4a, the automatic threshold adaptation procedure was an updating procedure for the one or more threshold values. In the following, another embodiment will be described, in which the automatic threshold adaptation procedure comprises a threshold change procedure that responds to the connectivity state of the link. As shown in FIG. 4b, which can be arranged in place of steps S7 and S4 in FIG. 3, it is first determined in a step S72 if the connectivity state of link 1 has changed, and if this is the case, then a threshold change procedure S42 is initiated.

The determination in step S72 preferably simply determines if the link 1 provides connectivity or not. In other words, it is determined if data units may be transported or not. The threshold change procedure of step S42 is preferably arranged in such a way that when the connectivity state of link 1 changes in such a way that no data units are transported, e.g., the link is down, then the threshold $L_{th}$ is increased, e.g., by multiplying the momentary value by a predetermined factor fc. In other words, when the link loses connectivity, then the procedure in step S42 increases the length threshold value from $L_{th}$ to fc·$L_{th}$.

Figure 5:
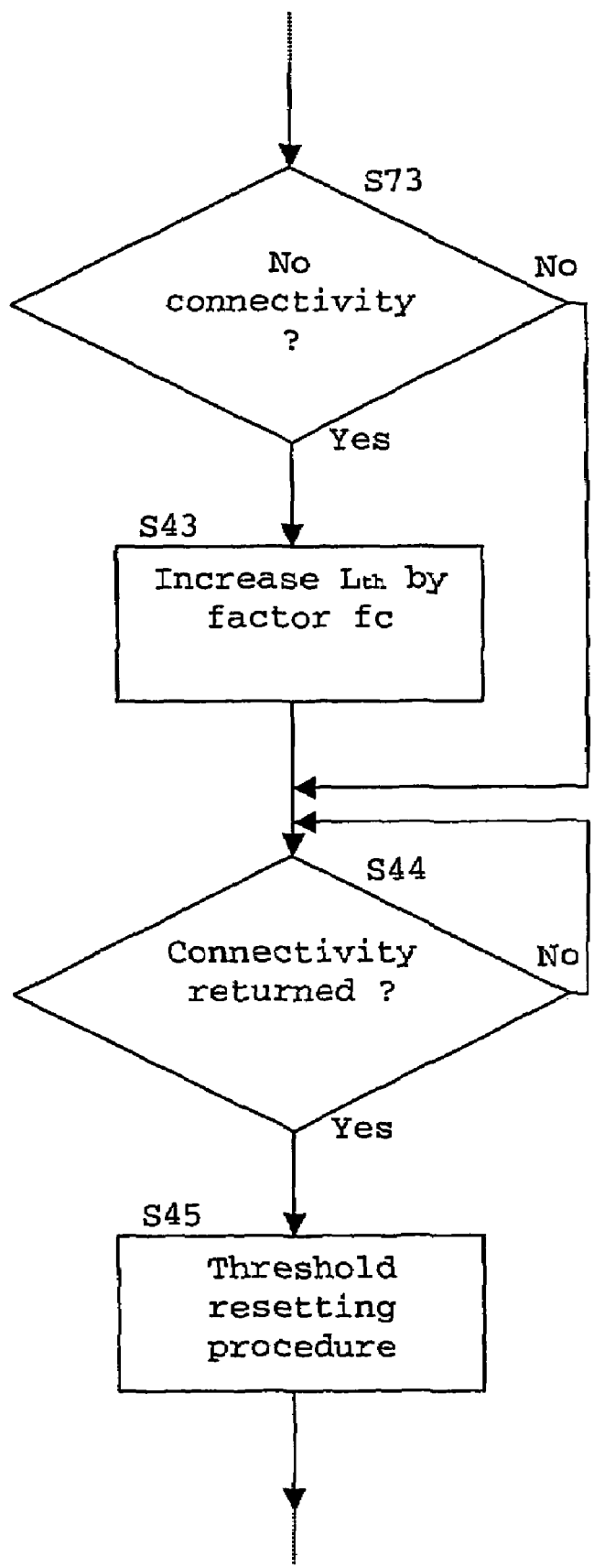
FIG. 5 shows a flow chart for explaining an embodiment a length threshold change procedure depending on the link connectivity.

As shown in FIG. 5, where steps S73 and S43 correspond to steps S72 and S42 of FIG. 4b, the step of increasing the threshold $L_{th}$ is preferably followed by a step S44, in which it is determined whether the connectivity has returned. If this is the case, then the flow advances to step S45, in which the threshold is reset to a new value. The resetting can be done back to the threshold prior to the increase, i.e., the previously increased value is divided by the factor fc, or a new determination of $L_{th}$ can be conducted, e.g. as explained previously in connection with the updating procedure for $L_{th}$. In other words, one or more link characteristics are measured, such as the RTT and DR, and the new value of $L_{th}$ is calculated according to a predetermined function thereof, e.g., according to the above equation (2).

Although it is possible to immediately reset the length threshold value $L_{th}$ to the new value, it is preferable to only gradually change the value in dependence on the number of data units in the queue (the momentary queue length) at the time of resetting the threshold. Namely, if the threshold $L_{th}$ is suddenly reduced, and the queue length related parameter used as a basis for initiating the congestion notification procedure is suddenly larger than threshold $L_{th}$, then a large number of congestion notification operations (e.g., the dropping of a large number of data units) suddenly occurs. In order to avoid this, the threshold resetting procedure of step S45 can be implemented in such a way that the high initial value of $L_{th}$ is not immediately reset to the new value, but much rather first reduced to the momentary value of the queue length related parameter (e.g., QL or $QL_{av}$) and then subsequently reduced if the queue length related parameter is reduced, until the above calculated new value for $L_{th}$ is reached.

The advantage of the above described link change procedure in dependence on the connectivity state of the length is that an unnecessary congestion notification operation in the event of a link outage is avoided. Especially in the event that the congestion notification operation consists in dropping data units, the threshold change procedure in dependence on link connectivity assures that the entire load of data units going into the buffer is absorbed or buffered at the link during link outages, while data unit losses are prevented. The underlying assumption is that the bandwidth available to the data units is basically unchanged after the link outages. Therefore, the performance of a congestion notification procedure would give the wrong information to the end-points sending or receiving the data units, which would then typically respond with an unwarranted restriction of data units being sent.

As already mentioned previously, the steps S71, S41 of FIG. 4a can replace steps S7, S4 of FIG. 3, steps S72, S42 of FIG. 4b can replace steps S7, S4 of FIG. 3, and steps S73 to S45 of FIG. 5 can replace steps S7, S4 of FIG. 3. Further, it is also possible to combine the updating procedure of FIG. 4a with the threshold change procedure of FIG. 4b or FIG. 5, e.g., by arranging steps S71, S41, S72, and S42 in series as a replacement for steps S7, S4 of FIG. 3.

Further, it may be mentioned that the method of the present invention can also be supplemented by an automatic threshold reduction procedure for automatically reducing the length threshold value $L_{th}$ in dependence on the current memory capacity available to the queue buffer 2.

Although the present invention has been described with the help of detailed embodiments, these only serve to convey a better understanding of the invention, and are not intended to restrict the scope. The scope of the present invention is defined by the appended claims. Reference signs in the claims serve to make the claims easier to understand, and also do not restrict the scope.

The invention claimed is:

1. A method of controlling a queue buffer, said queue buffer being connected to a link and being arranged to queue data units in a queue, said method comprising:
   determining a value (QL; $QL_{av}$) of a length parameter related to the length of said queue;
   comparing said value (QL; $QL_{av}$) with a length threshold value ($L_{th}$; $min_{th}$; $max_{th}$); and,
   performing a congestion notification procedure if said value (QL; $QL_{av}$) is equal to or greater than said length threshold value ($L_{th}$; $min_{th}$; $max_{th}$), wherein an automatic threshold adaptation procedure automatically adapts said length threshold value ($L_{th}$; $min_{th}$; $max_{th}$) on the basis of one or more characteristics of said link.

2. The method of claim 1, wherein said automatic threshold adaptation procedure updates said length threshold value ($L_{th}$; $min_{th}$; $max_{th}$) at regular intervals.

3. The method of claim 1, wherein said automatic threshold adaptation procedure comprises determining whether one or more of said one or more characteristics has changed, and updating said length threshold value ($L_{th}$; $min_{th}$; $max_{th}$) when a change has occurred.

4. The method of claim 1, wherein one of said one or more characteristics is a parameter (RTT) indicative of the time period that passes between the sending of a data unit over said link and the receipt of an associated acknowledgment message.

5. The method of claim 4, wherein one of said one or more characteristics is the data rate (DR) provided by said link for sending said data units.

6. The method of claim 5, wherein said automatic threshold adaptation procedure comprises estimating a link capacity value (LC) and determining said length threshold value ($L_{th}$; $min_{th}$; $max_{th}$) on the basis of said estimated link capacity value (LC).

7. The method of claim 6, wherein said automatic threshold adaptation procedure comprises estimating the link capacity value (LC) on the basis of
the parameter (RTT) indicative of the time period that passes between the sending of a data unit over said link and the receipt of an associated acknowledgment message, and
the data rate (DR) provided by said link for sending said data units.

8. The method of claim 7, wherein said link capacity value (LC) is estimated by determining the sum of a value of said parameter (RTT) indicative of the time period that passes between the sending of a data unit over said link and the receipt of an associated acknowledgment message and a first predetermined constant ($RTT_{WC}$), and setting said link capacity value (LC) equal to the product of said sum and said data rate (DR).

9. The method of claim 8, wherein said first predetermined constant ($RTT_{WC}$) represents an estimation of the maximum time period that passes between the sending of a data unit from its origin to its destination and the receipt of an associated acknowledgment message at its origin, excluding the time period that passes between the sending of said data unit over said link and the receipt of an associated acknowledgment message over said link.

10. The method of claim 9, wherein said first predetermined constant ($RTT_{WC}$) is in the range of 200 ms to 300 ms.

11. The method of claim 6, wherein said length threshold value ($L_{th}$; $min_{th}$; $max_{th}$) is set equal to said estimated link capacity value (LC).

12. The method of claim 6, wherein said length threshold value ($L_{th}$; $min_{th}$; $max_{th}$) is set equal to the sum of said estimated link capacity value (LC) and a second predetermined constant ($\epsilon$).

13. The method of claim 1, wherein said length threshold value ($L_{th}$; $min_{th}$; $max_{th}$) is a first length threshold value ($min_{th}$), said congestion notification procedure comprises comparing said value (QL; $QL_{av}$) of a length parameter to a second length threshold value ($max_{th}$) larger than said first length threshold value ($min_{th}$), and said automatic threshold adaptation procedure comprises determining said second length threshold value ($max_{th}$) as the sum of said first length threshold value ($min_{th}$) and a predetermined constant.

14. The method of claim 1, wherein said automatic threshold adaptation procedure comprises a threshold change procedure arranged to automatically change the value of said length threshold value ($L_{th}$; $min_{th}$; $max_{th}$) depending on the connectivity state of said link.

15. The method of claim 14, wherein said threshold change procedure comprises determining whether said connectivity state allows the transmission of data units, and if the connectivity state is such that no transmission of data units is allowed, increasing said length threshold value ($L_{th}$; $min_{th}$; $max_{th}$) according to a predetermined threshold increasing procedure.

16. The method of claim 15, wherein said threshold increasing procedure comprises multiplying the current length threshold value ($L_{th}$; $min_{th}$; $max_{th}$) by a predetermined factor (fc).

17. The method of claim 16, wherein said predetermined factor (fc) is two.

18. The method of claim 15, wherein said threshold change procedure furthermore comprises determining whether said connectivity state again allows the transmission of data units after a threshold increasing procedure, and if the connectivity state is such that a transmission of data units is again allowed, resetting said length threshold value ($L_{th}$; $min_{th}$; $max_{th}$) to a new value according to a predetermined threshold resetting procedure.

19. The method of claim 18, wherein said threshold resetting procedure comprises returning the length threshold value ($L_{th}$; $min_{th}$; $max_{th}$) to the value before having performed the threshold increasing procedure.

20. The method of claim 18, wherein said threshold resetting procedure comprises adapting said length threshold value ($L_{th}$; $min_{th}$; $max_{th}$) on the basis of the current values of one or more characteristics of said link.

21. The method of claim 18, wherein said threshold resetting procedure comprises gradually resetting said length threshold value ($L_{th}$; $min_{th}$; $max_{th}$) to said new value depending on the number of data units in said queue buffer.

22. The method of claim 21, wherein said threshold resetting procedure comprises resetting said length threshold value ($L_{th}$; $min_{th}$; $max_{th}$) to the momentary value of the length (QL) of said queue, if said momentary value of the length (QL) of said queue exceeds said new value, and gradually reducing said length threshold value ($L_{th}$; $min_{th}$; $max_{th}$) to the successively reducing momentary values of the length (QL) of said queue, until said new value is reached.

23. The method of claim 1, wherein said step of determining a value (QL; $QL_{av}$) of a parameter related to the length of said queue and said step of comparing said value (QL; $QL_{av}$) with a length threshold value ($L_{th}$; $min_{th}$; $max_{th}$) are performed at regular intervals.

24. The method of claim 1, wherein said step of determining a value (QL; $QL_{av}$) of a parameter related to the length of said queue and said step of comparing said value (QL; $QL_{av}$) with a length threshold value ($L_{th}$; $min_{th}$; $max_{th}$) are performed when said buffer receives a new data unit to be sent over said link.

25. The method of claim 1, wherein said congestion notification procedure comprises making a data unit dropping decision for dropping or retaining a data unit.

26. The method of claim 1, wherein said congestion notification procedure comprises making a data unit flagging decision for setting or not setting a congestion notification flag in a data unit.

27. The method of claim 25, wherein said decision is made for a newly received data unit.

28. The method of claim 1, wherein said length parameter (QL; $QL_{av}$) related to the length of said queue is a current length (QL) of said queue.

29. The method of claim 1, wherein said length parameter (QL; $QL_{av}$) related to the length of said queue is an average length ($QL_{av}$) of said queue.

30. The method of claim 1, wherein said link is a wireless link.

31. The method of claim 1, further comprising an automatic threshold reduction procedure for automatically reducing the length threshold value ($L_{th}$; $min_{th}$; $max_{th}$) in dependence on the current memory capacity available to said queue buffer.

32. The method of claim 1, wherein said data units are Internet Protocol packets.

* * * * *